(No Model.)
H. W. LAFFERTY.
PROCESS OF UTILIZING REFUSE OF BREWERIES.
No. 345,703. Patented July 20, 1886.
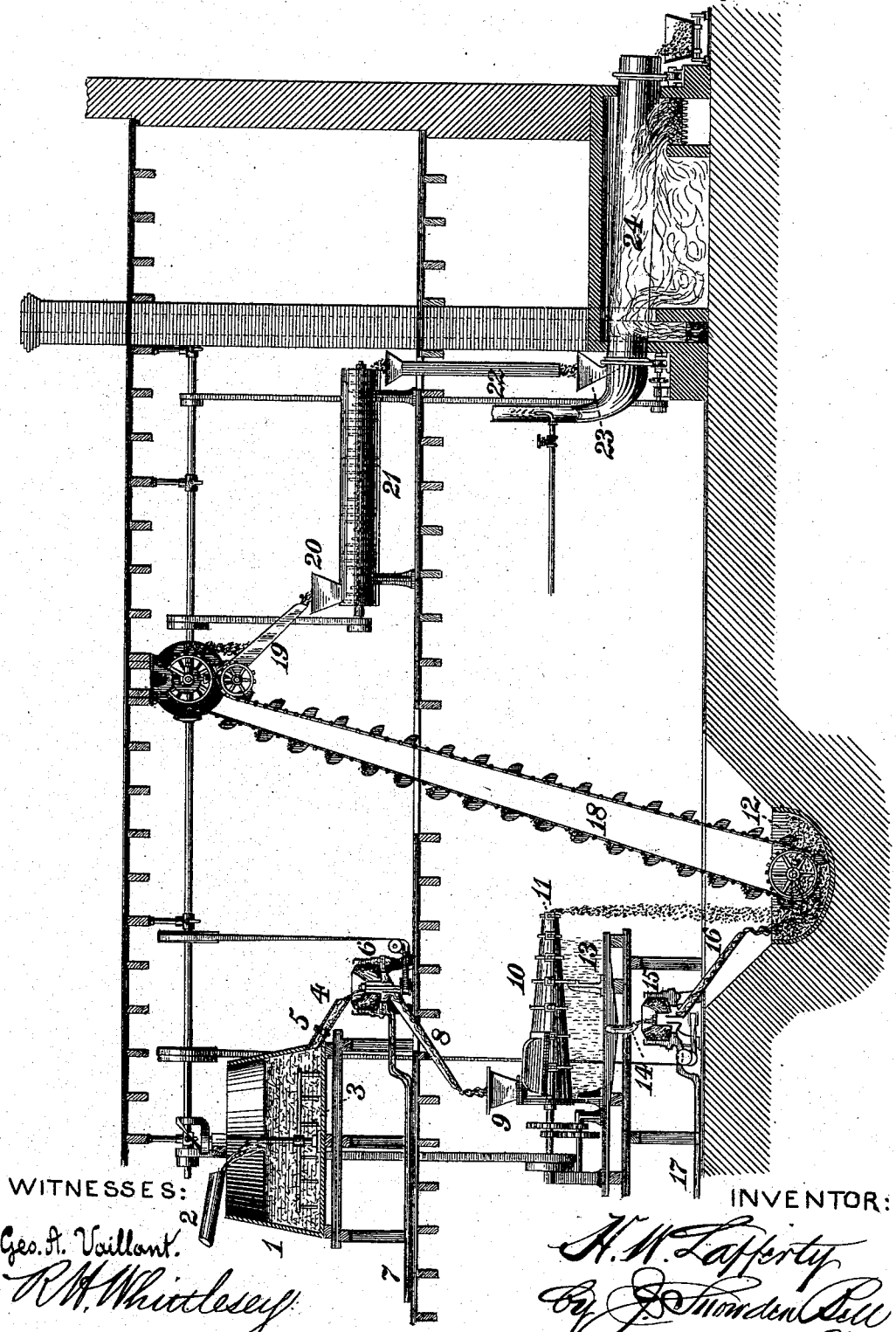

UNITED STATES PATENT OFFICE.

HUGH W. LAFFERTY, OF GLOUCESTER, NEW JERSEY.

PROCESS OF UTILIZING REFUSE OF BREWERIES.

SPECIFICATION forming part of Letters Patent No. 345,703, dated July 20, 1886.

Application filed December 17, 1885. Serial No. 185,881. (No specimens.)

*To all whom it may concern:*

Be it known that I, HUGH W. LAFFERTY, of Gloucester, in the county of Camden and State of New Jersey, have invented certain new and useful Improvements in Processes for Utilizing the Refuse or Slops of Breweries, Distilleries, Starch-Factories, &c., of which improvements the following is a specification.

In sundry operations in which grain of different descriptions is subjected to treatment involving the action of water and heat for the purpose of extracting certain of its constituents — as, for example, in brewing, distilling, and the manufacture of starch — a semi-liquid residuum is produced in large quantities, the same consisting of a mixture of water with hulls of grain, meal, gluten, gum, cellulose, and other ingredients. The alimentary properties of these solid constituents are such as to render them desirable and valuable as food for cattle; but the difficulty and expense of extracting them have heretofore prevented the residuum from being made a source of profit; and, on the other hand, owing to the facility with which the residuum is subject to fermentation and putrefaction, it is necessary to speedily remove and dispose of it, often at considerable expense in so doing, to avoid the institution of an offensive and dangerous nuisance.

The object of my invention is to enable the utilization of the alimentary constituents of brewers' or distillers' refuse or slops or analogous material to be expeditiously and economically effected, so as to prevent any accumulation of this material on the hands of the manufacturer, and obviate deterioration of its quality by continuously conducting its treatment immediately upon its production.

To this end my invention consists in a process or method of treating residuum of the character above mentioned, which is hereinafter fully set forth.

In the treatment of brewers' and distillers' "grains" or "slops" as heretofore practiced the material has been supplied to a tank or vat, and there allowed to settle, after which the surplus water was drawn off. During this operation the material deteriorates and tends to become sour, and in drawing off the water a considerable portion of the gluten and other valuable constituents is lost. The settlings were then removed from the tank and dried by the application of artificial heat, in which operation a large area of drying-surface was necessary and the expense of fuel was considerable. The separation of the liquid portion of the residuum by centrifugal draining-machines and its expression by means of pressure have also been essayed; but such operations were found to be unsatisfactory, by reason either of their slowness or of the waste of valuable constituents that were thrown off with the water, or both.

Referring to the accompanying drawing, which illustrates an arrangement of apparatus desirably adapted to the practice of my invention, the semi-liquid residuum to be treated is delivered as produced through a spout or channel, 2, into a receiving-tank, 1, which should be provided with a suitable stirrer or agitator, 3, by the rotation of which the liquid and solid constituents of the residuum are kept thoroughly mixed together to prevent the settling of the solid matters. The residuum is drawn off from the tank 1 through a discharge-spout, 4, governed by a cock or valve, 5, into a centrifugal separating-machine, 6, adapted to separate the solid and liquid constituents by the difference of their specific gravities under the influence of centrifugal force.

The construction of the centrifugal separating-machine not constituting part of my present invention, and various types thereof being known in the art, the same need not be herein set forth, further than to specify that it should be provided with a solid or imperforate drum or basket, so as to obviate any loss of solid matter in the separation of the water. Rotation being imparted to the drum or basket of the centrifugal-separator 6, and the residuum fed continuously thereto, the solid constituents are driven by the action of centrifugal force against the inner surface of the drum, and there accumulate, while the major portion of the water is discharged through one or more passages at the top of the drum into the casing of the machine, and escapes, free from solid constituents, through a pipe, 7, by which it is led to any desired point of discharge. The moist and pasty aggregation of solid matter which accumulates on the wall of the drum or basket of the centrifugal separator 6, and which will be found to be in volume about one-fifth of the charge supplied thereto, is cleared off from time to time as the drum becomes filled, and discharged from the drum through a chute, 8, from which it is fed, either directly or in separate successive charges, as may be found most convenient, into the receiving-hopper of a continuous press, 10, by which a further separation of the solid and liquid constituents of the residuum as received from the separator 6 is effected, a very large proportion, or nearly all, of the solid material being discharged, in a comparatively dry condition, from the delivery-opening 11 of the press into a suitable bin or receptacle, 12, while the water, with such small proportion of gluten and other solid constituents as it may carry off, is squeezed out by the press into a pan or trough, 13.

To effect the retention and saving of any solid constituents of the watery discharge from the press 10, the same is fed from the pan 13 through a pipe, 14, into a secondary or supplemental centrifugal separating-machine, 15, of similar construction to that first specified. The remaining portion of the contained solid matter is collected in the drum of the machine 15, and is discharged therefrom from time to time through a chute into the bin 12, which receives the solid discharge of the press, while the clear water is discharged into the casing of the machine and runs off through a waste-pipe. The comparatively-dry material supplied, as above stated, from the press and secondary centrifugal separator to the bin 12, is carried therefrom in any convenient manner, as by a conveyer, 18, to a feed-spout, 19, from which it is delivered to the hopper 20 of a mixer, 21, in which its particles are thoroughly mixed together, and is finally fed through a chute or conduit, 22, into the receiving-hopper 23 of a drier, 24, of any approved construction. Inasmuch as nearly all the moisture has been removed from the material in the preceding operations, the application of a comparatively-low degree of heat for a brief period suffices to complete in a thorough manner the drying operation, and the resultant product as removed from the drier will be in proper condition to be packed for storage or transportation in readiness for use.

It will be seen that the treatment to which the residuum is subjected is comprised in a continuous process, which is conducted by mechanical devices throughout, so that no time is lost between its different stages, and but little manual labor or attendance is required. The nutritive properties of the residuum are made available in the highest degree practicable by the prevention of waste of gluten and similar matter, which is insured by the secondary straining and separating operations, and the discharged water, being substantially free from solid ingredients, constitutes no source of nuisance or annoyance.

I do not desire to limit myself to the use of apparatus specifically similar to that herein illustrated and referred to, as the same may be varied in many particulars without departing from the spirit of my invention; neither do I herein claim such or any other plant or combination of apparatus for the conduct of the process which constitutes my present invention, as said apparatus or plant is the subject of a separate application for Letters Patent by me.

I claim as my invention, and desire to secure by Letters Patent—

1. The process of utilizing refuse or slops of breweries, distilleries, &c., which consists in first eliminating the major portion of the water therefrom by centrifugal separation, then straining out or expressing a portion of the water from the partially-solid residue of such centrifugal separation by pressure, then subjecting the watery residue of the pressing operation to a secondary centrifugal separation, and finally subjecting the partially-solid residues of the pressing operation and the secondary centrifugal separation to the action of heat, substantially as set forth.

2. The improvement in the method of utilizing refuse or slops of breweries, distilleries, &c., which consists in first eliminating the major portion of the water therefrom by the difference of the specific gravities of the solid and liquid portions under the action of centrifugal force, then straining out or expressing a portion of the water from the partially-solid residue of such centrifugal separation by pressure, and finally subjecting the partially-solid residue of the pressing operation to the action of heat, substantially as set forth.

HUGH W. LAFFERTY.

Witnesses:
CHARLES H. BARNARD,
EDMUND W. LAFFERTY.